Patented Aug. 21, 1951

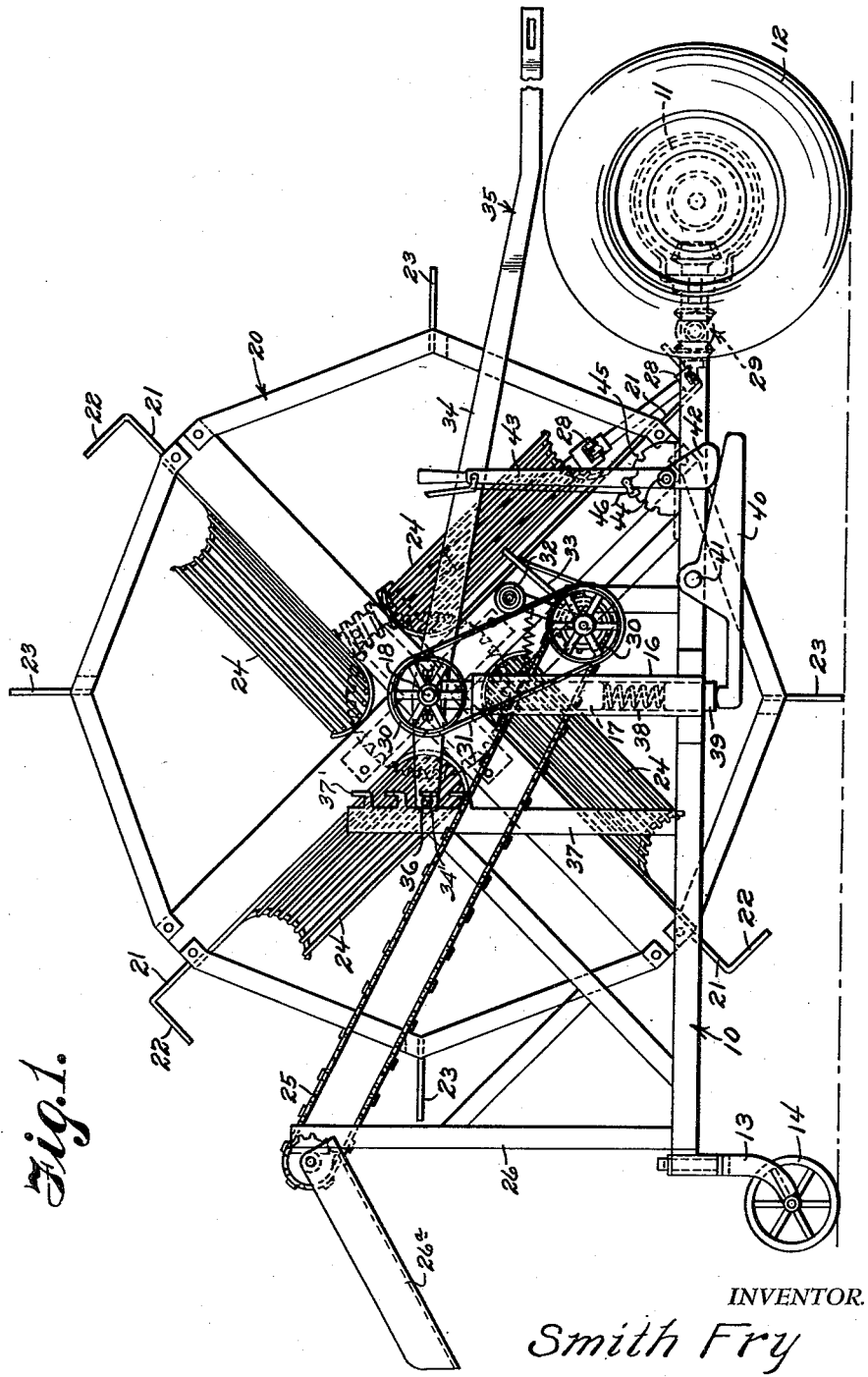

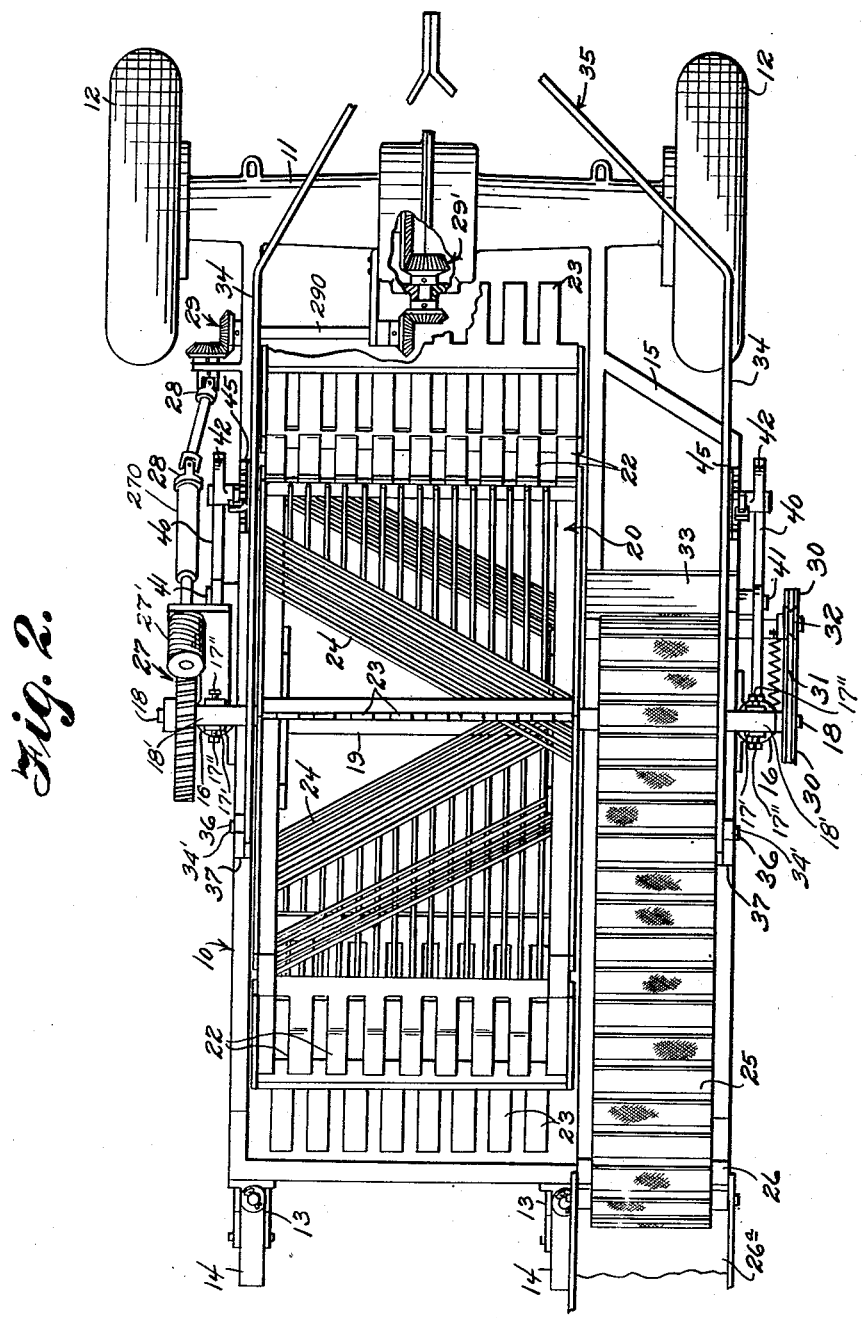

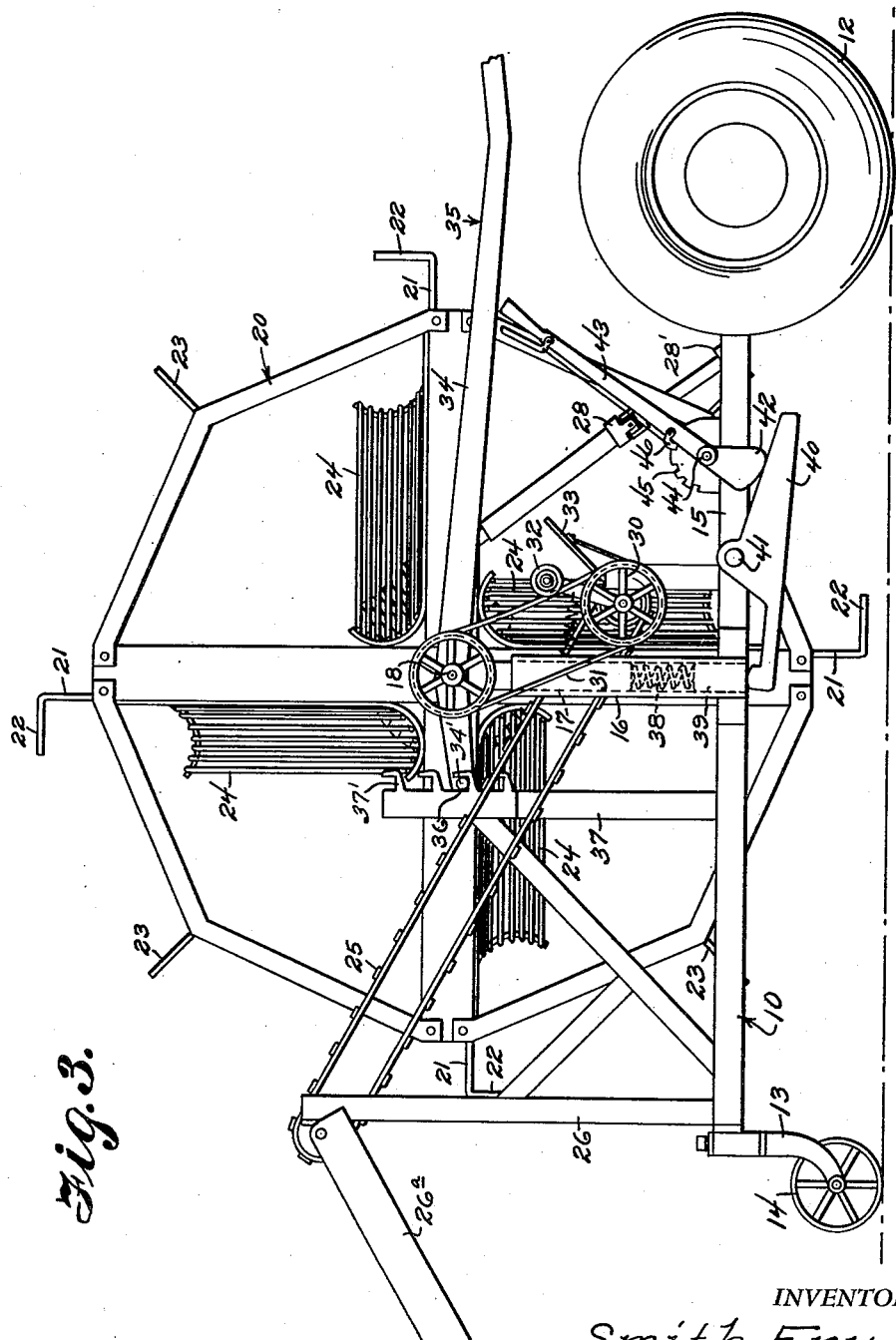

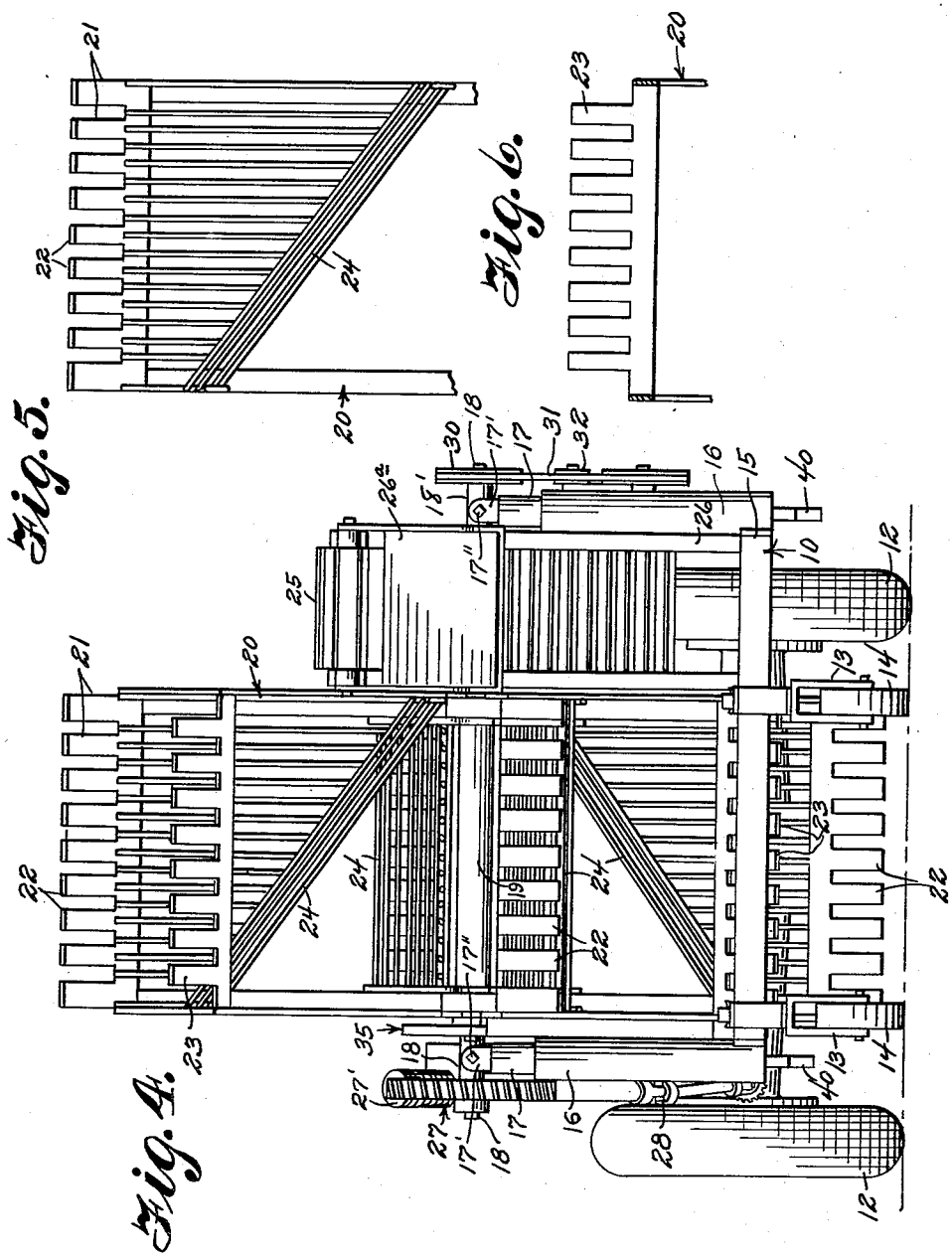

2,564,805

UNITED STATES PATENT OFFICE 2,564,805

ROCK PICKER AND LOADER

Smith Fry, Mansfield, Mo.

Application April 23, 1946, Serial No. 664,299

2 Claims. (Cl. 55—17)

The invention relates to a stone or rock picking apparatus, and more especially to a rock picking and loading machine.

The primary object of the invention is the provision of a machine of this character, wherein under draft of a tractor or the like it will pick up and load rocks, stones or other solids from the ground, that is to say, plowed or harrowed soil, the machine being automatic in the working thereof, and it enables the picking and loading of rock, stones or the like with dispatch and without manual labor for this purpose.

Another object of the invention is the provision of a machine of this character, wherein the rotary picker can be adjusted toward and away from the ground, and it is yieldably supported in a vertical direction so as to properly perform its function in accordance with the characteristics of the ground or surface worked.

A further object of the invention is the provision of a machine of this character, wherein the construction thereof is novel and the assembly of its parts unique in the arrangement of the same, the machine being effective for the quick clearing of a field from rocks or stones and the loading thereof for deposit without requiring manual labor and the difficulties experienced thereby.

A still further object of the invention is the provision of a machine of this character, which is comparatively simple in construction, thoroughly reliable and efficient in operation, strong, durable, operative under draft thereof by a draft medium, susceptible of control by the operator of the draft medium, thus minimizing labor, and inexpensive to manufacture.

With these and other objects in view the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a side view of the machine constructed in accordance with the invention;

Figure 2 is a top plan view, partly broken away;

Figure 3 is a view similar to Figure 1 showing the machine in a different adjusted position;

Figure 4 is an end elevation;

Figure 5 is a fragmentary elevation of a portion of the rotary picker;

Figure 6 is a view similar to Figure 5 and of another portion thereof.

Similar reference characters indicate corresponding parts throughout the several views in the drawings.

Referring to the drawings in detail, the machine constituting the present invention comprises, an elongated wheeled chassis frame 10 built with a differential axle housing 11 at its fore end, for the differential mechanism of any selected type, not shown, in association with the front pneumatic tired traction wheels 12, while at the opposite rear end of this frame are the swiveled forks 13 for the rear traction wheels 14.

This frame 10 at one longer side thereof is provided with an outwardly directed lateral extension 15, while rising vertically from the latter outside thereof and the opposite outer side of the said frame 10, midway of the latter, are upstanding tubular posts 16 in which are fitted at their upper ends plungers 17 which slidably telescope within such posts. The upper ends of each plunger 17 has a fork member 17' fixed thereto which is adapted to receive a journal sleeve 18' having journaled therein a rotatable reel axle 18, disposed horizontally crosswise of the said frame 10 and extension 15 respectively. Each fork member 17' is provided with a pair of bolts 17'' which engaging the sleeve 18' on opposite sides thereof retain the sleeve rigidly fixed in the fork member.

The axle 18 has fixed thereto directly over the frame 10 the hub 19 of a reel 20 turning therewith. The reel 20 at its perimeter has radially disposed picker tines 21, which are formed with scooping tips 22 at their outer ends projecting beyond the perimeter of such reel, for the picking from the ground rocks, stones, or the like, when the reel rotates in one direction. On the reel 20 intermediate with relation to the tines 21 are radially disposed rake heads 23, which also project beyond the perimeter of such reel congruous to the tines.

Within the reel 20 and corelated to the tines 21 inward to their tips 22 are slatted laterally sloping chutes 24, the slipe of all being in the same direction when reaching the highest point in the rotation of the reel and toward an endless loading conveyor 25 of the apron type, which is supported by a stand 26 upon the extension 15, the conveyor 25 being inclined in a downward direction toward the extension 15 and rises aft of the frame 10 for feeding material into a discharge spout 26, reversely sloping to that of the conveyor, and the latter receives rock, stone and other like material from the chutes 24 gathered therein from the tips 22 of the tines 21 when the machine is under draft.

Power is supplied to the axle 18 through the worm and gear assembly 27. The worm 27' being rotated by a conventional telescopic shaft 270 which is connected by universal connections 28 and 28' to the gear mechanism 29 which in turn is connected to the gear mechanism 29' by a short shaft 290. The gear mechanism 29' having a direct drive with the front wheels 12. Thus the reel will pick up rocks, stones or the like, not shown, when the machine is drawn over the ground. Motive power being furnished to the machine by means of a tractor or the like, not shown, through the medium of a draft hitch which may be connected to the fore end of the frame 18 of the machine.

The lower end of the conveyor 25 has pulley and belt driven connections 30 and 31 respectively, with the axle 18, there being a belt tightener 32 coacting with the belt 31. This conveyor 25 at its lower end has a back stop 33 to prevent material from gravitating from such conveyor in the operation thereof.

Fitted to each sleeve 18' inwardly of each fork member 17' are the arms 34 of a lifter yoke 35, and such arms are provided with outwardly extending pin projections 34' which are adjustably racked at 36 in relatively spaced hooked members 37' formed on the upstanding racking standards 37, which rigidly stand upright from the frame 10 and extension 15 outermost thereof. The plungers 17 work against coiled tensioning springs 38 within the posts 16, and such springs are tensioned by plungers, one being identified at 39, slidably fitted within the lower end of its companion post. Each plunger 39 is acted upon by a rocker 40, vertically swingable on a pivot 41, and engaged by a throw lever cam 42, the throw lever 43 being pivoted at 44 to a latch keeper segment 45 fixedly upstanding from the frame and extension. The lever 43 is fitted with a hand released latch 46 adjustably engageable with the segment 45 to hold such lever in adjusted position which is hand controlled. Thus it will be seen that the reel 20 can be raised and lowered by the lever 43 to the positions shown in Figures 1 and 3 of the drawings, and in this way regulating the relationship of the tines and heads 21 and 23 to the ground in the working of the machine.

The yoke 35 can be controlled in any manner, preferably at the draft medium, so that the reel 20 can also be lifted by such yoke, when the occasion requires. The reel 20 is maintained under tension by each other springs 38 as should be obvious.

In the operation of the machine when it is advanced the tines 21 will pick up rocks, stones or the like from ground, and feed them within the chutes 24, whence they will be conveyed by the conveyor 25 to the discharge spout 26, for deposit in any selected manner.

What is claimed is:

1. A machine of the kind described comprising a wheeled frame for ground travel, a transversely extending axle carried by the frame, a reel revoluble on the axle, radially extending gathering tines having scooping tips on the outer ends thereof mounted on the periphery of the reel, rake heads intermediate of the tines and radially disposed on the periphery of the reel congruous to the tines, laterally inclined chutes affixed to the reel inwardly of the tines, a conveyor mounted on the frame at one side of the reel for receiving material from the chutes on rotation of the reel, a spring support at either end of the axle and a lever for simultaneously adjusting the tension of the springs and means operatably associated with the reel and the conveyor for moving the reel and conveyor.

2. A machine of the kind described comprising a wheeled frame for ground travel, a transversely extending axle carried by the frame, a reel revoluble on the axle, radially extending gathering tines having scooping tips on the outer ends thereof mounted on the periphery of the reel, rake heads intermediate of the tines and radially disposed on the periphery of the reel, congruous to the tines, laterally inclined chutes affixed to the reel inwardly of the tines, a conveyor mounted on the frame at one side of the reel for receiving material from the chutes on rotation of the reel, a spring support at either end of the axle, a lever for simultaneously adjusting the tension of said springs, an adjustably mounted yoke for lifting the axle and reel with respect to the frame and means operatably associated with the reel and the conveyor for operating the reel and conveyor.

SMITH FRY.

REFERENCES CITED

The following references are of record in the file of this patent:

UNITED STATES PATENTS

| Number | Name | Date |
|---|---|---|
| 41,424 | Chase | Feb. 2, 1864 |
| 181,628 | Boyd | Aug. 29, 1876 |
| 759,937 | Symonds | May 17, 1904 |
| 1,193,189 | Richter | Aug. 1, 1916 |

FOREIGN PATENTS

| Number | Country | Date |
|---|---|---|
| 62,906 | Germany | June 24, 1892 |